United States Patent

[11] 3,583,802

| [72] | Inventors | Paul Calinescu;<br>Constantin Botez, both of Bucharest,<br>Romania |
|---|---|---|
| [21] | Appl. No. | 801,964 |
| [22] | Filed | Feb. 25, 1969 |
| [45] | Patented | June 8, 1971 |
| [73] | Assignee | Studioul Cinematografic Bucuresti<br>Bucharest, Romania |

[54] SYSTEM FOR TAKING CINEMATOGRAPHIC AND TELEVISION PICTURES AND FOR PROJECTING THEM ON SCREENS
4 Claims, 4 Drawing Figs.

[52] U.S. Cl. ............................................. 352/221,
178/7.2, 352/40, 352/44
[51] Int. Cl. ........................................... G03b17/00,
G03b 21/00
[50] Field of Search .......................................... 352/5, 221,
38—56, 79, 80; 178/7.2, 7.2 (D)

[56] References Cited
UNITED STATES PATENTS

| 1,624,947 | 4/1927 | Hernandez-Mejia | 352/42 |
| 1,845,519 | 2/1932 | Richard | 352/45 |
| 2,528,840 | 11/1950 | Mitchell | 352/79 |
| 2,890,277 | 6/1959 | Duke | 178/7.2(D) |
| 3,267,212 | 8/1966 | Goldmark et al. | 178/7.2X(D) |

FOREIGN PATENTS

| 655,072 | 7/1963 | Italy | 352/221 |

Primary Examiner—Louis R. Prince
Assistant Examiner—Harry C. Post, III
Attorney—Karl F. Ross ABSTRACT: In order to provide a more real and convincing effect when viewing an image of an object, this image is confined to a view field having the shape of the human field of vision. This shape is substantially that of an oval or ellipse with a horizontal major axis and somewhat flattened below this axis. A mask having an aperture of this shape is used in a camera, film printer or projector to attain this effect.

PATENTED JUN 8 1971

3,583,802

INVENTORS:
Paul Calinescu
Constantin Botez

BY Karl F. Ross
Attorney

SYSTEM FOR TAKING CINEMATOGRAPHIC AND TELEVISION PICTURES AND FOR PROJECTING THEM ON SCREENS

Our present invention relates to a system for forming an image of an object on an image plane, particularly as applied to still and motion pictures and television.

It is the accepted practice to take and project visual images in a square or rectangular view field corresponding to the shape of the screen. This practice has several disadvantages. Firstly, a rectangular field does not correspond to the human field of vision so that it gives a feeling of artificiality to the viewer. Secondly, the corners are often cluttered with unimportant details that serve only to distract him.

Due to the fact that most movie projection booths are not on the same level with the screen, a so-called "trapezium effect" or foreshortening of the image results. Consequently, different theaters or projection systems have varying effects upon the projected image.

In addition, lenses generally tend to distort to a certain extent near their edges, especially in the corners of a rectangular view field. Thus, the use of a rectangular or square view field increases the likelihood of distortion in the image.

It is, therefore, the principal object of our invention to overcome these drawbacks.

Another object of the invention is to provide an improved system for forming an image of an object on an image plane wherein the image is more real and plastic for the viewer than the image of earlier techniques.

A further object of our invention is to provide an improved system for filming and projecting optical images.

We attain these and other objects in accordance with the principal feature of our invention by providing a method wherein the view field is formed in the general shape of an oval or distorted ellipse. This view field has a vertical minor axis and a horizontal major axis with a ratio between them of 1:2.35 to 1:1.22 and is both symmetrical about the vertical axis and flattened below the major axis.

A system for carrying out this method has a mask with an aperture of the above-described shape in the camera and/or projector. This mask intercepts the periphery of a light beam and makes for a final view field having the desired shape.

These and other objects, features, and advantages of our invention will be described in the following, with reference to the drawing in which.

Figure 1:
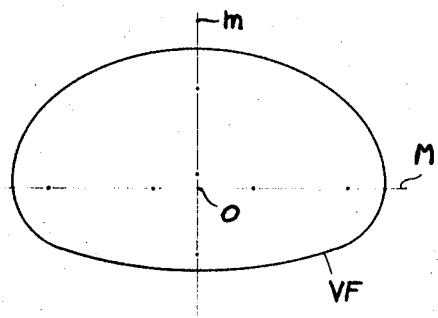
FIG. 1 shows a view field according to our invention as seen by a viewer.

In FIG. 1 the outline VF of a view field is shown, with its major axis M and minor axis m meeting at a center o. Here a ratio between the major and minor axes M and m of about 1:1.7 exists, with about five-eighths of the minor axis m being located above the center point o. Thus the view field has the configuration or outline of a flattened ellipse, which is the shape of the human field of vision.

Figure 2:
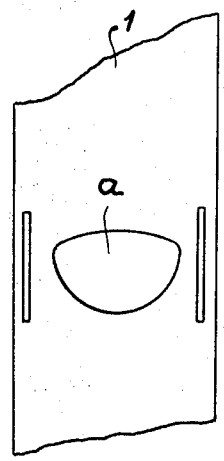
FIGS. 2 and 3 are front views of masks usable in a camera and a projector, respectively.
Figure 4:
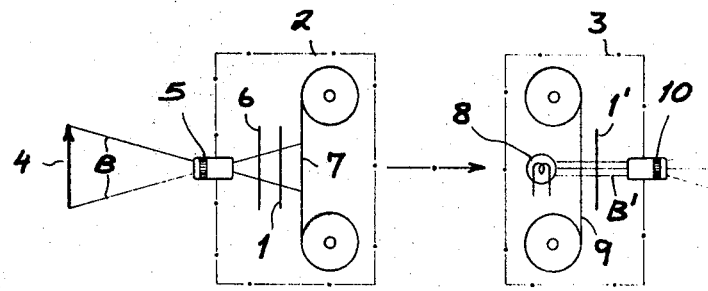
FIG. 4 diagrammatically shows a system for carrying out the method of my invention.

As shown in FIG. 4, a system for forming such a view field may consist of a camera 2 and a projector 3. A light beam B is derived from an image 4, and thence passed through a lens 5 and a shutter 6 and allowed to fall on a strip of film 7 forming an image plane. Between the shutter 6 and the film 7 of the camera 2 is a mask 1 having an oval or flattened-elliptical aperture $a$ as shown in FIG. 2. The mask can, of course, be located elsewhere in the optical path (e.g. as the window of the shutter or the aperture of a diaphragm for controlling the amount of light admitted). The exposed frames of motion-picture film will have similar view fields.

Figure 3:
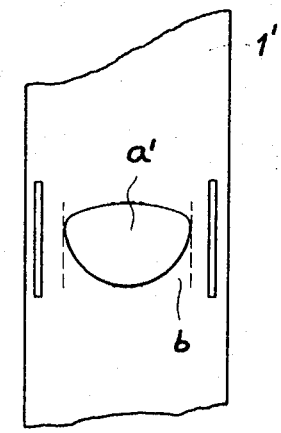

In the projector 3 a developed film 9, with rectangular frames is placed between a light source 8 and an objective 10, with a light beam B' passing through it. Thence the beam B' is projected onto an image plane or screen 11. A mask 1' between the film 9 and the objective 10—although it could also be between the light source 8 and the film 9—intercepts the periphery of the light beam B' and gives the projected view field the shape shown in FIG. 1 by continuous line VF. Even if the view field on the film has a rectangular shape $b$ as shown in FIG. 3, the mask 1' will clip the edges off. Where a second motion-picture film is provided at 11, the system constitutes a film printer.

Of course, instead of the film in FIG. 4, an orthicon tube or iconoscope could be used. In the same vein, a mask having an aperture as shown in FIG. 1 may be fitted to the face of a television-display tube or screen. We prefer however to make use of rectangular viewing areas and to intercept the periphery of the beam on image formation or projection as described above. In addition, should a mask be used in the camera, one will not necessarily be needed in the projector, and vice versa. In addition, a mask imparting the desired configuration to the image frame of a motion picture can be provided in the printing process whereby a film negative (with rectangular frames) is used to make a projection positive with oval or flattened-elliptical frame. It has been found that the "trapezium" effect described above is substantially ameliorated when an image with an oval or flattened-elliptical outline, as shown, is projected upon a screen with a projection axis deviating from a perpendicular to the screen.

We claim:

1. A system of forming an image of an object on an image plane, said system comprising:
   means for deriving a light beam from said object;
   means for optically training said beam on said image plane; and
   means intercepting the periphery of said beam for forming a view field on said image plane corresponding substantially to the human field of vision and having the general shape of an ellipse having an upright minor axis and a generally horizontal major axis in a ratio between 1:2.35 and 1:1.22, said field being substantially symmetrical about said upright axis and flattened below said major axis.

2. The system defined in claim 1 wherein said means for optically training said beam is a lens and said means for intercepting said beam is a mask between said lens and said image plane, said system being a camera.

3. The system defined in claim 1 wherein said means for optically training said beam is a lens and said means for intercepting said beam is a mask, said system being a projector.

4. The system defined in claim 1 wherein the object is an image on a first motion-picture film and said image plane if formed by a second motion-picture film whereby the system constitutes a film printer.